US012222163B2

(12) United States Patent
Koenning et al.

(10) Patent No.: US 12,222,163 B2
(45) Date of Patent: Feb. 11, 2025

(54) COOLER FOR COOLING BULK MATERIAL

(71) Applicants: thyssenkrupp Industrial Solutions AG, Essen (DE); thyssenkrupp AG, Essen (DE)

(72) Inventors: Ludwig Koenning, Ahlen (DE); Justin Bisping, Warendorf (DE); Stefanie Richter, Oelde (DE); Michael Streffing, Lippetal (DE); Rolf Rieger, Bielefeld (DE); Frank Crabus, Warendorf (DE); Jochen Altfeld, Muenster (DE)

(73) Assignees: thyssenkrupp Polysius GmbH, Beckum (DE); thyssenkrupp AG, Essen (DE)

( * ) Notice: Subject to any disclaimer, the term of this patent is extended or adjusted under 35 U.S.C. 154(b) by 81 days.

(21) Appl. No.: 18/007,644

(22) PCT Filed: May 17, 2021

(86) PCT No.: PCT/EP2021/062924
§ 371 (c)(1),
(2) Date: Dec. 1, 2022

(87) PCT Pub. No.: WO2021/244836
PCT Pub. Date: Dec. 9, 2021

(65) Prior Publication Data

US 2023/0243590 A1 Aug. 3, 2023

(30) Foreign Application Priority Data

Jun. 2, 2020 (BE) .................................. 2020/5389
Jun. 2, 2020 (DE) ..................... 10 2020 206 819.4

(51) Int. Cl.
*F27D 15/02* (2006.01)

(52) U.S. Cl.
CPC .... *F27D 15/022* (2013.01); *F27D 2015/0233* (2013.01)

(58) Field of Classification Search
CPC ... F16J 15/16; F16C 33/80; F27B 1/24; F27B 3/24; F27B 2009/124; F27B 15/02;
(Continued)

(56) References Cited

U.S. PATENT DOCUMENTS

2010/0270750 A1 10/2010 Schinke

FOREIGN PATENT DOCUMENTS

CN 201837253 U 5/2011
CN 202511636 U * 10/2012
(Continued)

OTHER PUBLICATIONS

English Translation of International Search Report issued in PCT/EP2021/062924, dated Jul. 13, 2021.

*Primary Examiner* — Gregory A Wilson
(74) *Attorney, Agent, or Firm* — thyssenkrupp North America, LLC

(57) ABSTRACT

A cooler for cooling bulk material, such as cement clinker, for example, may include an aeration floor through which cooling gas can flow. The aeration floor may be configured to receive bulk material and to transport the bulk material in a conveying direction. The aeration floor comprises a plurality of conveying beams that are mounted so as to be movable in the conveying direction and counter to the conveying direction. A seal is mounted between two adjacent conveying beams, and the seal has at least two sealing elements mounted so as to be movable relative to one another. The sealing elements each have a sealing profile, which interact with one another such that a sealing gap is formed between them. The sealing gap has a double or multiple U-profile.

17 Claims, 2 Drawing Sheets

(58) Field of Classification Search
CPC ........ F27B 2009/007; F27B 2015/0253; F27B 2015/0233
See application file for complete search history.

(56) References Cited

FOREIGN PATENT DOCUMENTS

| | | | | | |
|---|---|---|---|---|---|
| CN | 203703133 | U | | 7/2014 | |
| CN | 209726828 | U | | 12/2019 | |
| CN | 112146451 | A | * | 12/2020 | |
| DE | 20 2004 020 573 | U1 | | 8/2005 | |
| DE | 102004060207 | A1 | * | 6/2006 | ................ F27B 7/38 |
| DE | 20 2006 012 333 | U1 | | 12/2007 | |
| DE | 10 2008 003 692 | A1 | | 7/2009 | |
| EP | 2 362 174 | A1 | | 8/2011 | |
| EP | 2 799 406 | A1 | | 11/2014 | |
| EP | 3118555 | A1 | * | 1/2017 | ......... F27D 15/0213 |
| WO | WO-2009087010 | A1 | * | 7/2009 | .............. F26B 17/26 |

* cited by examiner

COOLER FOR COOLING BULK MATERIAL

CROSS REFERENCE TO RELATED APPLICATIONS

This application is a U.S. National Stage Entry of International Patent Application Serial Number PCT/EP2021/062924, filed May 17, 2021, which claims priority to German Patent Application No. DE 10 2020 206 819.4, filed Jun. 2, 2020, and Belgian Patent Application No. BE 2020/5389, filed Jun. 2, 2020, the entire contents of all of which are incorporated herein by reference.

FIELD

The present disclosure generally relates to apparatuses and methods for cooling bulk material, including a cooler for cooling bulk material that has a seal for sealing a gap between movable conveying beams.

BACKGROUND

Coolers for cooling bulk material are used, for example, in cement works for cooling the clinker fired in a kiln. The cooler usually has a conveying unit for transporting the material along a supporting surface through which cooling air can flow. To transport the material, use is preferably made of conveying beams which, arranged adjacent to one another, form an aeration floor on which the material to be cooled rests. For transport purposes, the conveying beams are moved simultaneously in the conveying direction and non-simultaneously counter to the conveying direction, for example, resulting in the material being transported in the conveying direction.

During the relative movement of the individual adjacent conveying beams, material falls through the gap formed between the conveying beams. It is known from the prior art that this gap can be sealed by means of a seal. DE 20 2006 012 333 U1 shows a seal for a cooler operating on the "walking-floor principle", in which two seal segments simply overlap. This does not completely prevent material from entering the gap between the conveying beams.

Thus a need exists for a cooler for cooling bulk material, which cooler has a seal for sealing a gap between two conveying beams which reliably prevents material from falling through the gap.

DETAILED DESCRIPTION

Figure 1:
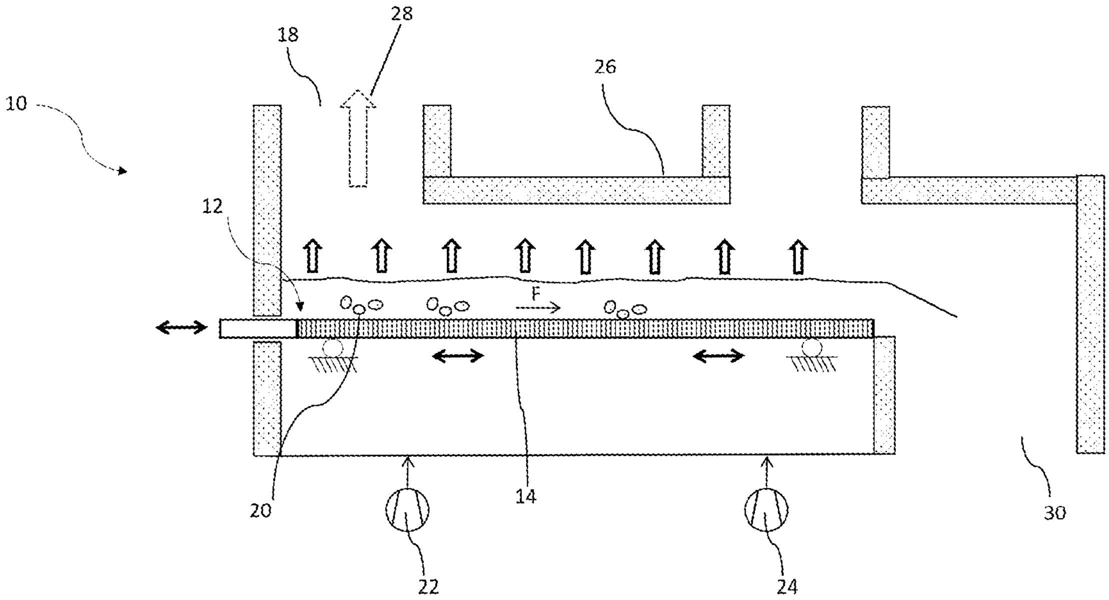
FIG. 1 is a schematic, longitudinal sectional view of an example cooler for cooling bulk material.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

According to a first aspect, a cooler for cooling bulk material, in particular cement clinker, comprises an aeration floor, through which cooling gas can flow, for receiving bulk material and for transporting the bulk material in the conveying direction. The aeration floor comprises a plurality of conveying beams, which are mounted so as to be movable in the conveying direction and counter to the conveying direction, wherein a seal is in each case mounted between two adjacent conveying beams, which seal has at least two sealing elements mounted so as to be movable relative to one another. The sealing elements each have a sealing profile, wherein the sealing profiles interact with one another in such a way that a sealing gap is formed between them. The sealing gap has an at least double or multiple U-profile. It is likewise conceivable for the sealing gap to have a triple or quadruple U-profile. The sealing elements are preferably designed and arranged relative to one another in such a way that the sealing gap formed between them has an at least double or multiple U-profile.

The sealing gap is formed between the sealing elements of the seal and represents the path which the material must travel in order to pass through the seal into the gap between two adjacent conveying beams. A double U-profile has at least six changes of direction within the sealing gap, which the material must overcome in order to pass completely through the seal. The seal therefore reliably prevents bulk material from falling through the gap formed between two adjacent conveying beams. A double U-profile may also be referred to as an M-profile, for example. The invention offers the advantage that no material accumulates within the seal and a relative movement of the seal elements is reliably ensured.

The sealing profiles of the respective sealing elements preferably overlap at least twice. The sealing gap has at least six, in particular seven or eight, angles of approximately 80° to 100°, preferably 90°.

The cooler is, in particular, part of a cement production plant having a preheater for preheating raw meal in crossflow and a kiln for firing the preheated raw meal to form clinker. The cooler is preferably arranged directly downstream of the kiln, with the result that the fired clinker falls into the cooler, e.g. on account of gravity. The material inlet of the cooler is adjoined, for example, by the cooler inlet region and has, for example, a static grate, which is arranged below the kiln outlet, with the result that the bulk material emerging from the kiln falls onto the static grate on account of gravity. The static grate is, for example, a grate set at an angle to the horizontal of 10° to 35°, preferably 12° to 33°, in particular 13° to 21°, through which cooling air flows from below.

The cooler has, for example, an aeration floor which adjoins the static grate and is formed by a plurality of parallel, adjacently arranged conveying beams. The aeration floor receives the bulk material to be cooled and preferably has a plurality of cooling air passages, thus enabling cooling air to flow through the aeration floor from below. The material lying on the aeration floor is cooled in crossflow while being moved in the conveying direction of the cooler. The conveying beams are mounted so as to be movable relative to one another in the conveying direction. The conveying direction is, in particular, the longitudinal direction of the cooler, in particular substantially horizontal. In order to convey the bulk material in the conveying direction, the conveying beams are, in particular, all moved together simultaneously in the conveying direction and non-simultaneously counter to the conveying direction. During a simultaneous movement of the conveying beams in the conveying direction, the material resting on the conveying beams is likewise moved in the conveying direction. During the non-simultaneous movement counter to the conveying direction, the material remains largely in its position since only individual conveying beams are moved underneath the material. This process is repeated several times until the cooled material has reached the cooler outlet.

A seal is mounted between two adjacent conveying beams. In addition, a seal is preferably likewise provided between each of the outer conveying beams and the stationary cooler wall in order to seal the respective gap between the conveying beam and the cooler wall.

According to a first embodiment, a sealing profile is designed as a U-profile. Preferably, at least one sealing profile is designed as a simple U-profile and, in particular, has precisely one U-profile. The U-profile is preferably formed from two parallel webs and one web orthogonal thereto, wherein the orthogonal web connects the two parallel webs to one another. The parallel webs of the sealing profile are preferably oriented vertically.

According to a further embodiment, at least one of the sealing profiles is designed as a double U-profile. The sealing element preferably has a sealing profile which has precisely two U-profiles, wherein one U-profile corresponds to that described above. In particular, the sealing profile has three parallel webs which are each spaced apart from one another and are preferably of the same length. For example, only the outer webs have the same length, while the inner, central web is designed to be shorter than the outer webs.

For example, the seal comprises a first sealing element with a sealing profile designed as a simple U-profile and a second sealing element with a sealing profile designed as a double U-profile. The first sealing element is preferably formed below the second sealing element. In particular, the second sealing element encloses the first sealing element, and therefore the surface on which the bulk material lies is formed only by the second sealing element. The first and the second sealing element are preferably arranged relative to one another in such a way that the sealing gap with the double U-profile is formed between them. In particular, the sealing elements are arranged without contact with one another.

According to a further embodiment, the sealing elements of a seal are each mounted on mutually adjacent conveying beams. It is likewise conceivable for the seal to have more than two sealing elements, wherein at least one sealing element or a plurality of sealing elements of a seal is/are preferably mounted on each conveying beam.

According to a further embodiment, the seal has a chamber for collecting bulk material which has entered the sealing gap, and wherein the chamber is formed between the at least two sealing profiles of a seal. In particular, the chamber is an extension of the sealing gap and is preferably arranged in the middle of the seal. The chamber is preferably formed between the two U-profiles within the sealing gap. This offers the advantage that material which has passed through one of the U-profiles of the sealing gap is collected in a chamber, allowing it to be removed from the latter before it passes further through the sealing gap.

For example, the chamber is arranged between the two webs of the sealing profile which is designed as a simple U-profile, and is preferably bounded at the top by the central web of the sealing profile which is designed as a double U-profile. The chamber preferably forms a low point of the sealing gap, and therefore material collected in the chamber would have to be moved counter to gravity in order to get out of the chamber.

According to a further embodiment, the seal has a compressed air generating device, which is connected to the chamber in order to supply the chamber with compressed air. The compressed air generating device is, for example, a fan. For example, the compressed air generating device designed as a fan is mounted below the aeration floor and serves, in particular additionally, to generate cooling air flowing through the bulk material. The chamber preferably has an outlet for discharging bulk material from the chamber, thus enabling the bulk material to be blown out of the chamber by means of the compressed air generating device. The compressed air generating device is preferably designed in such a way that it generates compressed air which is suitable for conveying bulk material out of the chamber in the direction of an outlet.

According to a further embodiment, the compressed air generating device is designed in such a way that it supplies the chamber with compressed air in the conveying direction. This permits simple transport of the bulk material collected in the chamber, while blowback of the bulk material into the sealing gap is reliably avoided.

According to a further embodiment, the seal comprises a plurality of seal segments, which are arranged one behind the other in the conveying direction and are connected to one another. The seal segments are preferably of identical design, allowing easy replacement, e.g. in the event of wear.

According to a further embodiment, the seal extends in the conveying direction over the entire length of the conveying elements. The sealing elements are made of different materials, for example.

FIG. 1 shows a cooler 10 for cooling hot bulk material 20, in particular cement clinker. The cooler 10 is preferably arranged downstream of a kiln, not shown in FIG. 1, in particular a rotary kiln, for firing cement clinker, and therefore hot bulk material 20 emerging from the kiln falls onto the cooler 10 as a result of gravity, for example.

The cooler 10 has a material inlet 18 for the admission of hot bulk material 20 into the cooler 10. The material inlet 18 is, for example, the region between the kiln outlet and the aeration floor of the cooler 10, the bulk material 20 preferably falling through the material inlet 18 as a result of gravity. The bulk material 20 to be cooled has, for example, a temperature of 1200 to 1450° C. in the material inlet 18.

The cooler 10 has an aeration floor 12, which serves to receive the bulk material 20 to be cooled. The aeration floor 12 comprises a plurality of conveying beams 14, which are arranged adjacent to one another and together form the aeration floor 12, on which the bulk material 20 to be cooled rests. The conveying beams 14 extend in the conveying direction F over the entire length of the cooler 10, for example. The aeration floor 12, in particular each of the conveying beams 14, has a plurality of cooling air passages or is designed, for example, as a grate, thus enabling cooling air to flow from below the aeration floor 12, through the latter and the bulk material 20 lying thereon. Arranged below the aeration floor there are, for example, two fans 22, 24 for applying cooling air to the bulk material 20. The cooler 10 furthermore has a housing 26 for delimiting the cooling chamber within the cooler 10 with respect to the ambient air. By way of example, a recuperation air outlet 28, through which cooling air heated in the cooler 10 leaves the cooler 10 and is fed, for example, to the upstream kiln, preheater or calciner, is arranged in the housing 26. The cooler 10 has a material outlet 30, through which the cooled bulk material 20 leaves the cooler 10.

Within the cooler 10, the bulk material 20 to be cooled is moved in the conveying direction F. The conveying beams 14 are mounted within the cooler 10 so as to be movable in the conveying direction F and counter to the conveying direction F. Preferably, the conveying beams 14 can be moved in accordance with the "walking floor principle", in which the conveying beams 14 are all moved simultaneously in the conveying direction F and non-simultaneously counter to the conveying direction F. The cooler in FIG. 1 can additionally have a static grate, which is arranged upstream of the aeration floor and, in particular, forms the inlet region of the cooler, on which the bulk material to be cooled emerging from the kiln first impinges. The static grate is, for example, a grate set at an angle to the horizontal of 10° to 35°, preferably 12° to 33°, in particular 13° to 21°, through which cooling air flows from below.

Figure 2:
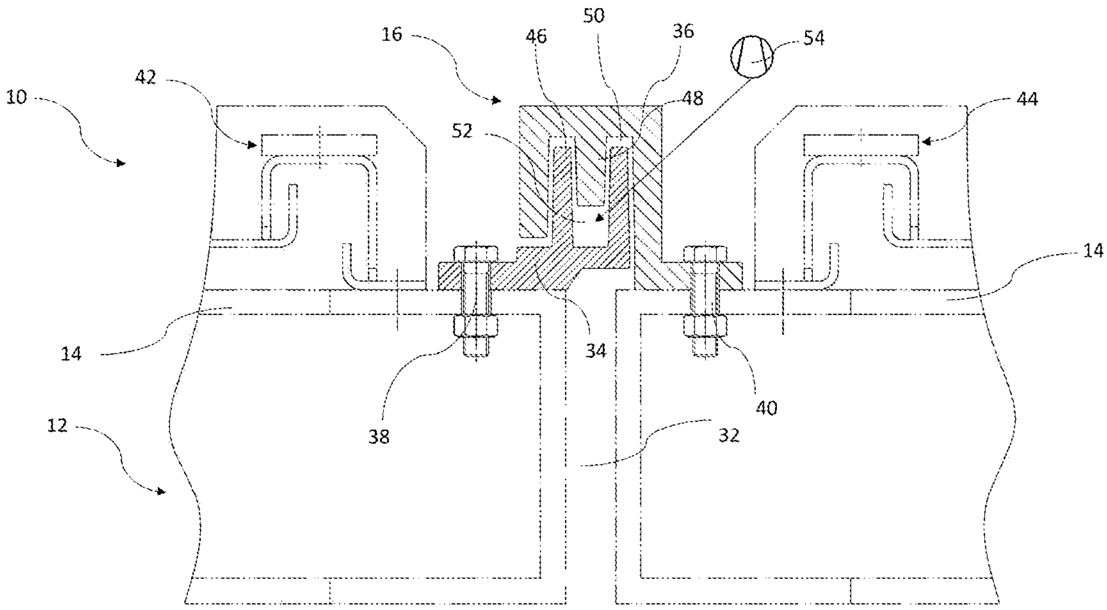
FIG. 2 is a schematic, cross-sectional view of a detail of an aeration floor of an example cooler with a seal.

FIG. 2 shows a detail of the cooler. In particular, FIG. 2 shows a detail view of a seal 16 between two adjacent conveying beams 14, two adjacent conveying beams 14 being illustrated at least partially.

The two adjacent conveying beams 14 are mounted in such a way that they can be moved relative to one another in the conveying direction F and counter to the conveying direction F. A gap 32 is formed between the adjacent conveying beams 14, through which gap the bulk material 20 lying on the upper side of the conveying beams 14 can fall, particularly when the bulk material is being conveyed and the conveying beams 14 are moving relative to one another. Mounted on the upper side of each of the conveying beams 14 there are, for example, conveying elements 42, 44, which preferably extend transversely to the conveying direction F and simplify the transport of the bulk material 20 in the conveying direction.

Furthermore, the cooler 10 has a seal 16, which is arranged between two adjacent conveying beams 14. By way of example, the seal comprises two seal elements 34, 36. Each of the seal elements 34, 36 is secured on a respective conveying beam 14. By way of example, the seal elements 34, 36 are each screwed to the respective conveying beam by means of screws 38, 40. The seal elements each have a sealing profile 46, 48, wherein the sealing profiles 46, 48 interact with one another in such a way that a sealing gap 50, preferably of substantially uniform width, is formed between them.

By way of example, the seal 16 is a double labyrinth seal. A labyrinth seal is to be understood as meaning a seal in which the sealing gap 50 has at least two angles of at least 90°. As a result, the flow path of the bulk material 20 for entry into the gap 32 between the adjacent conveying beams 14 is significantly increased.

By way of example, one of the sealing profiles 46 is designed as a U-profile and, in particular, has two parallel webs spaced apart from one another. The webs extend in the vertical direction, for example, and are preferably of equal length. By way of example, the other sealing profile 48 is designed as a double U-profile and, in particular, has three parallel webs which are each spaced apart from one another and are preferably of the same length. In particular, the central web is designed to be shorter than the two outer webs. The two outer webs of the sealing profile 48 which is designed as a double U-profile preferably at least partially or completely enclose the webs of the sealing profile 46 which interacts therewith.

By way of example, a chamber 52, in which material which has penetrated into the sealing gap 50 collects, is formed within the seal 16. The chamber 52 is in each case formed between two webs of a respective sealing profile 46, 48, for example. In particular, the chamber 52 is an extension of the sealing gap 50 and is preferably arranged in the middle of the seal 16.

For example, the chamber 52 is arranged between the two webs of the sealing profile 46 which is designed as a simple U-profile, and is preferably bounded at the top by the central web of the sealing profile 48 which is designed as a double U-profile.

The chamber 52 preferably extends over the entire length of the seal 16. In particular, the chamber 52 is connected to a compressed air generating device 54, which is indicated only schematically in FIG. 2 for reasons of clarity. The compressed air generating device 54 serves to supply the chamber 52 with compressed air, the compressed air generating device 54 being, for example, a fan. The chamber 52 preferably has an outlet for discharging bulk material from the chamber 52, thus enabling the bulk material to be blown out of the chamber 52 by means of the compressed air generating device 54. The chamber 52 preferably forms a low point of the sealing gap 50.

The compressed air generating device 54 can alternatively be formed by one of the fans 22, 24, the chamber 52 thus being supplied with compressed air by means of the cooling air below the aeration floor 12. In this case, this is then a natural, unforced air flow in the chamber 52.

The seal 16 has, for example, a plurality of seal segments (not illustrated in the figures) arranged one behind the other in the conveying direction F. Respective adjacent seal segments are preferably connected to one another and together form the seal 16.

LIST OF REFERENCE SIGNS

10 cooler
12 aeration floor
14 conveying beam
16 seal
18 material inlet
20 bulk material
22 fan
24 fan
26 housing
28 recuperation air outlet
30 material outlet
32 gap
34 seal element
36 seal element
38 screw
40 screw
42 conveying element
44 conveying element
46 sealing profile
48 sealing profile
50 sealing gap
52 chamber
54 compressed air generating device
F conveying direction

What is claimed is:

1. A cooler for cooling bulk material including cement clinker, the cooler comprising:

an aeration floor through which cooling gas can flow, the aeration floor configured to receive bulk material and to transport the bulk material in a conveying direction;

conveying beams that are mounted so as to be movable in the conveying direction and counter to the conveying direction; and a seal mounted between two adjacent conveying beams of the conveying beams, wherein the seal includes sealing elements that are mounted so as to be movable relative to one another, wherein the sealing elements each have a sealing profile, the sealing profiles interacting with one another such that a sealing gap is formed therebetween, wherein the sealing gap has a double or multiple U-profile.

2. The cooler of claim 1 wherein one of the sealing profiles is configured as a U-profile.

3. The cooler of claim 2 wherein the U-profile includes a first web, a second web parallel to the first web, and a third web orthogonal to the first and second webs, wherein the third web connects the first web to the second web.

4. The cooler of claim 3 wherein the first and second webs are oriented vertically.

5. The cooler of claim 3 wherein the first web has a first length and the second web has a second length that is the same as the first length.

6. The cooler of claim 1 wherein one of the sealing profiles is configured as a double U-profile.

7. The cooler of claim 6 wherein the double U-profile includes a first web, a second web parallel to and spaced apart from the first web, and a third web parallel to and spaced apart from the first and second webs.

8. The cooler of claim 7 wherein the first web has a first length, the second web has a second length that is the same as the first length, and the third web has a third length that is the same as the first and second lengths.

9. The cooler of claim 7 wherein the second web is located between the first web and the third web, the first web has a first length, the second web has a second length that is less than the first length, and the third web has a third length equal to the first length.

10. The cooler of claim 1 wherein each sealing element is mounted on mutually adjacent conveying beams.

11. The cooler of claim 1 wherein the seal includes a chamber for collecting bulk material that has entered the sealing gap, wherein the chamber is formed between the sealing profiles.

12. The cooler of claim 11 wherein the seal has a compressed air generating device that is connected to the chamber to supply the chamber with compressed air.

13. The cooler of claim 12 wherein the compressed air generating device is configured to supply the chamber with compressed air in the conveying direction.

14. The cooler of claim 1 wherein the seal comprises seal segments that are arranged one behind another in the conveying direction and that are connected to one another.

15. The cooler of claim 1 wherein the seal extends in the conveying direction over an entire length of the conveying beams.

16. The cooler of claim 1 wherein the sealing elements include a first sealing element having a single U-profile and a second sealing element having a double U-profile.

17. The cooler of claim 16 wherein the first sealing element is below the second sealing element.

* * * * *